United States Patent [19]
Ebbing et al.

[11] Patent Number: 5,537,508
[45] Date of Patent: Jul. 16, 1996

[54] METHOD AND DRY VAPOR GENERATOR CHANNEL ASSEMBLY FOR CONVEYING A LIQUID FROM A LIQUID SOURCE TO A LIQUID VAPORIZER WITH MINIMAL LIQUID STAGNATION

[75] Inventors: Peter F. Ebbing, Los Altos; Kien N. Chuc, Cupertino, both of Calif.

[73] Assignee: Applied Materials, Inc., Santa Clara, Calif.

[21] Appl. No.: 227,973

[22] Filed: Apr. 15, 1994

Related U.S. Application Data

[63] Continuation-in-part of Ser. No. 34,066, Mar. 22, 1993, abandoned.

[51] Int. Cl.$^6$ ................................. F24F 3/14; F22B 1/28
[52] U.S. Cl. ................................. 392/402; 392/399
[58] Field of Search ................................. 392/396–397, 392/394, 400, 402, 403, 405; 261/19–21, 34.1, 37, 67, 142, 128; 122/488, 489

[56] References Cited

U.S. PATENT DOCUMENTS

| | | |
|---|---|---|
| 570,790 | 11/1896 | Gaiennie . |
| 644,862 | 3/1900 | Jacobus et al. . |
| 1,355,935 | 10/1920 | Benjamin . |
| 2,494,654 | 1/1950 | Glynn ................................. 219/39 |
| 3,267,678 | 8/1966 | Camp ................................. 60/108 |
| 3,339,531 | 9/1967 | Fitzgerald . |
| 3,637,979 | 1/1972 | Moeglich ................................. 219/271 |
| 3,654,780 | 4/1972 | Frank ................................. 68/222 |
| 4,091,056 | 5/1978 | Hamalainen ................................. 261/19 |
| 4,098,853 | 7/1978 | Brown et al. ................................. 261/122 |
| 4,276,243 | 6/1981 | Partus ................................. 261/128 |
| 4,281,636 | 8/1981 | Vegh et al. ................................. 126/369 |
| 4,356,834 | 11/1982 | LeMay ................................. 261/67 |
| 4,436,674 | 3/1984 | McMenamin ................................. 261/128 |
| 4,878,458 | 11/1989 | Nelson ................................. 122/4 |
| 4,977,094 | 12/1990 | Goldstein et al. ................................. 436/157 |
| 5,399,200 | 3/1995 | Stauffer ................................. 392/403 |

FOREIGN PATENT DOCUMENTS

| | | |
|---|---|---|
| 0323939 | 12/1989 | European Pat. Off. . |
| 0422653 | 4/1991 | European Pat. Off. . |
| 1237897 | 6/1960 | France . |
| 2512473 | 11/1983 | France . |
| 2653208 | 4/1991 | France . |
| 359303 | 9/1922 | Germany . |
| 1117228 | 11/1961 | Germany . |
| 1249666 | 9/1989 | Japan . |
| 2267985 | 10/1990 | Japan . |
| 832247 | 5/1981 | U.S.S.R. . |
| 681356 | 10/1952 | United Kingdom . |
| 890306 | 2/1962 | United Kingdom . |

*Primary Examiner*—Teresa J. Walberg
*Assistant Examiner*—Sam Paik
*Attorney, Agent, or Firm*—Limbach & Limbach

[57] ABSTRACT

An apparatus for generating dry vapor includes a manifold assembly with a channel for conveying a liquid from a liquid source. A vessel for holding the liquid is secured to the manifold assembly and includes a fill tube connected to receive liquid from the manifold assembly's channel. A heater is provided for heating the liquid in the vessel to generate a vapor. A settling chamber is located within the vessel above the liquid in the vessel from settling out liquid drops in the vapor. The settling chamber includes a vapor inlet with a cross-section that is substantially smaller than the vessel's cross-section for receiving vapor. A vapor outlet removes dry vapor from the settling chamber.

23 Claims, 3 Drawing Sheets

METHOD AND DRY VAPOR GENERATOR CHANNEL ASSEMBLY FOR CONVEYING A LIQUID FROM A LIQUID SOURCE TO A LIQUID VAPORIZER WITH MINIMAL LIQUID STAGNATION

RELATED U.S. APPLICATION DATA

This application is a continuation-in-part of U.S. application Ser. No. 08/034,066, filed Mar. 22, 1993 now abandoned.

BACKGROUND OF THE INVENTION

This invention relates generally to water vapor delivery systems and, more particularly, to a method and apparatus for generating dry vapor with minimal liquid stagnation, thereby limiting growth of bacteria and algae.

Semiconductor circuits commonly use aluminum films as a conductor material. The aluminum films are etched with chlorinated gases to produce connections within the circuits. However, chlorine often is retained within the sidewalls of the aluminum films and reacts with absorbed water vapor to form hydrochloric acid as soon as the semiconductor wafer is brought into ambient atmosphere from the controlled chamber environment after processing. The hydrochloric acid reacts with the aluminum film to form aluminum chlorides, which in turn react with the absorbed water vapor to produce more hydrochloric acid. This self-sustaining reaction corrodes the aluminum films and renders the affected semiconductor chip worthless.

One method of removing chlorine prior to transferring the wafer from the controlled chamber environment is to strip the photoresist from the wafer by ashing. Typically, a nitrogen and oxygen plasma is used with a wafer elevated to temperatures between 180° and 260° C. This technique has met with some success. Additional benefits are obtained by mixing in ammonia or carbon tetrafluoride, or both, as well. Corrosion protection of up to 24 hours has been obtained, but these results can not always be guaranteed.

Other methods of chlorine removal have used separate wafer washing modules, or wafer washing modules integrated with the etching system, to wash and rinse the etched wafers with water-based solutions as soon as possible after the etching process to remove the chlorine. However, these washing modules are generally large and are relatively costly.

Finally, a photoresist stripper process that includes water vapor plasma, sometimes combined with nitrogen and oxygen, has been used. The water vapor in the stripper is disassociated by the plasma so that the hydrogen will combine with the chlorine to form gaseous hydrochloric acid, which can be satisfactorily pumped from the stripper chamber. This technique has shown to be virtually totally reliable and can deliver corrosion protection in excess of 72 hours. However, the water vapor used in this method generally does not have a sufficiently high vapor pressure at ambient temperature to provide a supply of gas at a rate that will meet the requirements of the stripper. Also, because the vapor pressure of water varies with temperature, there is a need for a water vapor generator that can consistently supply water vapor at a rate and pressure that will meet or exceed the requirements of the stripper.

Previously, water vapor delivery systems used with the photoresist strippers included a relatively large assembly of readily available water and nitrogen valves, regulators, gauges, interconnecting tubing and fittings, all packaged in an externally mounted cabinet. Although the parts used to make these assemblies are easily obtained, the assemblies are bulky and expensive. Their bulkiness prevents the assemblies from being incorporated into a VDS (vapor delivery system) enclosure, and the cost of the assembly significantly increases the total cost of the water vapor delivery system. Furthermore, such assemblies include a significant "dead leg," the distance between the constantly circulating water source and the water vapor generator, that increases the risk of bacteria and algae growth in the assembly. The length of this dead leg can be six and one-half feet or more.

Additionally, early water vapor delivery systems incorporated a commercially available boiler, which is typically a large glass bottle, containing a liter or more of deionized water, captured within a temperature-controlled enclosure. A substantial portion of this container is purposely left empty to accumulate water vapor, which is drawn off through a mass flow controller. The water vapor flowing through the mass flow controller must be dry, i.e., be unsaturated, and contain relatively few water drops, preferably no drops at all. Accordingly, a substantial distance must be maintained between the water surface and the vapor outlet of the container to prevent water drops due to rising water bubbles from entering the vapor outlet. However, the bulky size of conventional boilers requires them to be located outside of present etching system enclosures. This necessitates running relatively long vapor lines to the strip chamber which exposes the heated and insulated vapor lines unduly to potential abuse by personnel working about the equipment.

SUMMARY OF THE INVENTION

The present invention is embodied in a method and apparatus for dry vapor generation with minimal liquid stagnation within a compact assembly. More particularly, the apparatus includes a manifold assembly with a channel for conveying a liquid from a liquid source, and a vessel for holding liquid with a fill tube connected to the manifold assembly's channel for receiving liquid from the manifold assembly. A heater is included for heating the liquid in the vessel. As the liquid is heated, vapor rises from the liquid surface and enters a settling chamber, located within the vessel, through a vapor inlet having a cross-section that is smaller than the vessel's cross-section. As the vapor travels through the settling chamber, the speed of the vapor decreases and liquid drops settle out of the vapor. The settling chamber includes a vapor outlet that releases a dry vapor, that is, a vapor that is unsaturated and contains relatively few, if any, liquid drops.

In a more detailed embodiment of the invention, the manifold assembly includes at least two blocks. Each block has an inlet port, an outlet port, a channel connecting the ports, and a mating surface for mating and sealing with the mating surface of another block. The blocks are in mating engagement at these mating surfaces such that one block's outlet port is aligned with another block's inlet port. The unmated inlet port is aligned with a liquid or gas source and the unmated outlet port is connected to the vessel's fill tube.

In another more detailed embodiment of the invention, the vessel's settling chamber includes a sloped bottom wall and a top wall. The chamber's vapor inlet is a small opening, or slit, located at the lower end of the bottom wall, and its vapor outlet is located in the top surface above the upper end of the bottom wall.

3

In yet another detailed embodiment of the invention, the vessel includes a second settling chamber for additional settling out of liquid drops in the vapor. The second settling chamber is located within the vessel above the first settling chamber, and there is a vapor orifice (forming a first vapor outlet for the first settling chamber and a first vapor inlet for the second settling chamber) in their common wall for transferring vapor from the first settling chamber to the second settling chamber. The second settling chamber also includes a second vapor outlet for removing dry vapor.

In other features of the invention, the vessel further includes a drain tube for removing the liquid from the vessel and a thermo-well tube for use with a thermocouple or thermistor to determine the temperature of the liquid in the vessel. Further, polytetrafluoroethylene balls or other types of boiling chips can be included in the vessel to reduce nucleate boiling.

In yet another more detailed feature of the invention, the diameter of the vessel is sized to generate water vapor at a maximum predetermined rate. In the preferred embodiment, the diameter of the vessel is about two inches to permit the apparatus to fit inside existing gas panels for supplying gases to a photoresist strip chamber. The preferred embodiment also includes four viewing ports and four sensors, located outside of the vessel, for sensing the level of the liquid in the vessel and for sensing an overflow condition.

In the method of the invention for providing dry vapor, liquid is supplied through a manifold assembly having a channel to a vessel where it is heated to generate a vapor. The vapor is transported to a settling chamber located within the vessel through a vapor inlet having a cross-section that is substantially smaller than the vessel's cross-section. The speed of the water vapor is decreased, thereby allowing liquid drops to settle out of the vapor. The liquid drops are returned to the bottom of the vessel and the dry water vapor is transported out of the settling chamber.

In a more detailed embodiment of this method, the dry vapor is transported to a second settling chamber, where additional liquid drops settle out of the vapor. The additional liquid drops are also returned to the bottom of the vessel and the dry vapor is transported out of the second settling chamber, preferably to a strip chamber.

Other features and advantages of the present invention should become apparent from the following description of the preferred embodiments, taken in conjunction with the accompanying drawings, which illustrate, by way of example, the principles of the invention.

DESCRIPTION OF THE PREFERRED EMBODIMENTS

Figure 1:
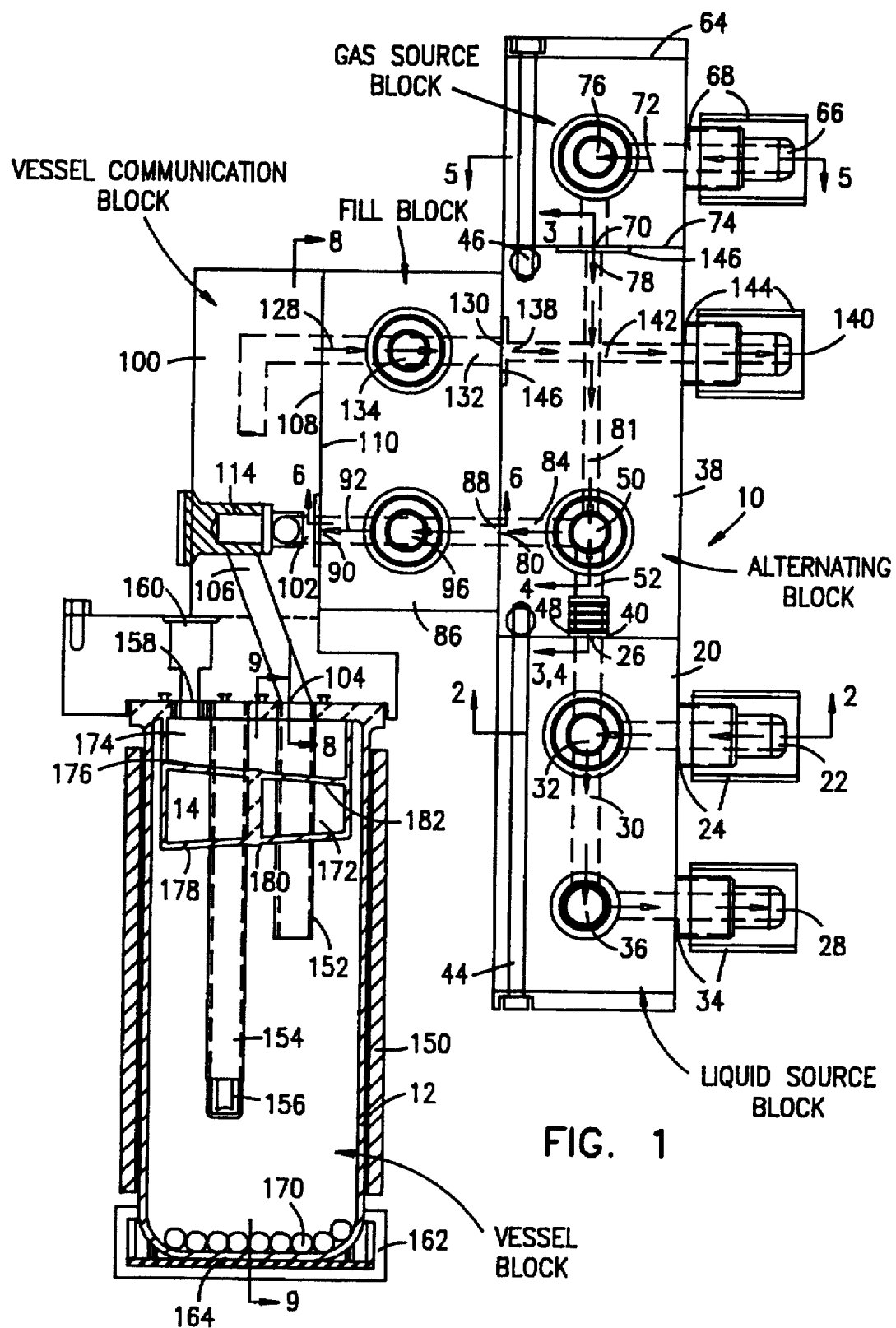
FIG. 1 is cross-sectional view of a dry vapor delivery apparatus embodying the invention, illustrating the manifold assembly and the dry vapor generator.

With reference now to the illustrative drawings, and particularly to FIG. 1, there is shown a compact dry vapor delivery apparatus according to the present invention for providing dry vapor to a strip chamber. The compact size of the apparatus renders it particularly useful with existing gas panels and equipment with limited space and permits a timed replacement of evaporated liquid to take place while a wafer containing stripped semiconductor chips is being transferred out of the photoresist strip chamber and replaced with another wafer for stripping. The delivery apparatus includes a novel manifold assembly 10 for supplying liquid from a liquid supply to an enclosed vessel 12 and settling chamber 14 for generating dry vapor.

In general, the manifold assembly 10 includes a channel for conveying a liquid from a liquid source to the fill tube of the vessel 12. More specifically, the manifold assembly includes at least two blocks, each block having at least one inlet port, one outlet port, a channel connecting the ports, and one mating surface. The blocks are in mating engagement at their mating surfaces such that the outlet port of one block is aligned with the inlet port of another block. This design forms a compact manifold assembly capable of enclosure in a VDS housing. Accordingly, it reduces both the "dead leg" and the expensive assembly of parts found in previous vapor delivery systems.

Figure 2:
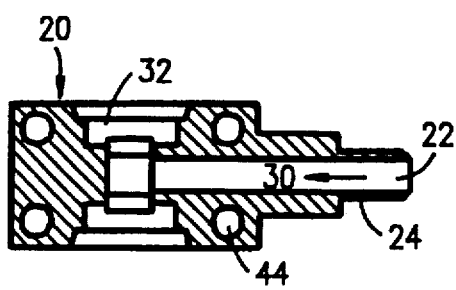
FIG. 2 is a cross-sectional view of the water source block which forms a portion of the preferred embodiment of the manifold assembly, taken along the line 2—2 of FIG. 1.

The liquid, generally, deionized water, used to remove the chlorine from a wafer is supplied by means of Teflon tubing to the manifold assembly 10 through a filter (not shown) to a first block, a liquid source block 20. As shown in FIGS. 1 and 2, this block has an inlet port 22 with a first connector 24, a first outlet port 26, a second outlet port 28 and a channel 30 connecting its ports. The liquid source block also includes a three way valve 32 located in the channel, to direct the flow of liquid from the inlet port either to the first outlet port or to the second outlet port. The three way valve is normally open to the second outlet port. Each of the valves included in the manifold assembly 10 is controlled by a microprocessor (not shown) and appropriate software.

Liquid is supplied to the manifold assembly 10 from a liquid source and it enters through the liquid source block's inlet port 22 in the first connector 24 and travels though channel 30 to three way valve 32. Until liquid is needed to replenish the liquid in the vessel 12, the liquid cycles through "the liquid source block loop," namely, from the first connector 24 to the three way valve 32 and then to the second outlet port 28. The liquid is normally returned to the liquid source for reconditioning, or it is transported to a drain. This continuous flow helps to limit bacteria and algae growth in the liquid.

The liquid source block 20 also includes a second connector 34 and a two way valve 36 located in channel 30 between three way valve 32 and second outlet port 28. The volume of the liquid flowing through the source block loop is controlled by trimming or widening the opening in the manually operated two way valve 36. In the preferred embodiment, solenoid diaphragm valves are used to control the flow of liquid and gas through the manifold assembly 10, except for two way valve 36 which is a manual valve. The detailed structure of the preferred embodiment of the solenoid diaphragm valves is described below with reference to FIG. 7.

Figure 3:
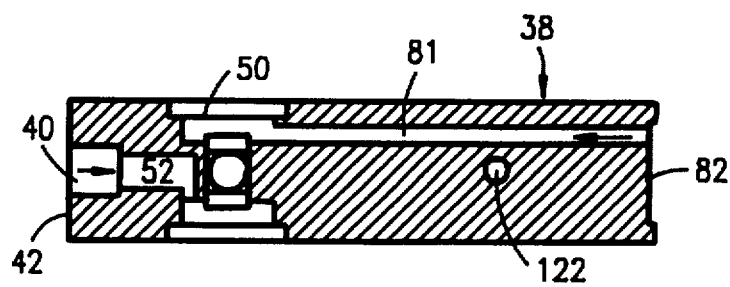
FIG. 3 is a cross-sectional view of the alternating block which forms a portion of the preferred embodiment of the manifold assembly, taken along the line 3—3 of FIG. 1.

When the vessel 12 needs to be replenished with liquid, the microprocessor switches the liquid source block's three way valve 32 such that the valve is open to the liquid source block's first outlet port 26. As shown in FIGS. 1 and 3, the liquid then enters a second block, alternating block 38, through the alternating block's first inlet port 40.

The liquid source block 20 and the alternating block 38 are matingly engaged at a mating surface on the liquid source block (not shown) and a first mating surface 42 (FIG. 3) on the alternating block such that the liquid source block's first outlet port 26 is aligned with the alternating block's first inlet port 40. All of the manifold assembly's blocks are held together by a plurality of threaded rods 44 that extend the length of one block and threadingly engage a threaded nut 46 included in another block. This design eliminates the need for connectors between the blocks, thereby decreasing the length of the manifold assembly over conventional water delivery systems.

After the liquid enters the alternating block's first inlet port 40, it travels through a pressure reducer 48 (FIGS. 1 and 4) that is connected between the first inlet port and a normally closed two way valve, a pulse valve 50 in a first channel 52. In the preferred embodiment, the pressure of the liquid from the liquid source can range from atmospheric pressure, if liquid is added to the manifold assembly 10 from a bottle, to about 90 psia (pounds per square inch absolute). However, the preferred operating range of the pressure of the liquid as it exits the manifold assembly and enters the vessel 12 is between 14.7 and 75 psia. The pressure reducer assists in controlling the pressure of the liquid entering the vessel within a narrow range by reducing the liquid pressure.

Figure 4:
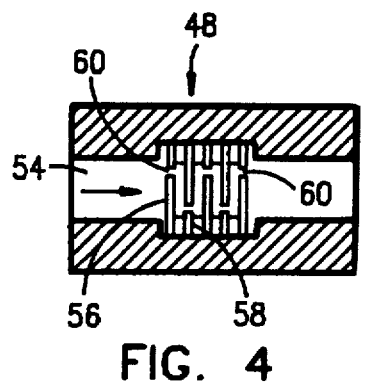
FIG. 4 is an exploded cross-sectional view of the pressure reducer included in the channel of the alternating block, taken along the line 4—4 of FIG. 1.

As shown in FIG. 4, the pressure reducer includes a channel 54 and at least a first spacer 56 and a second spacer 58 that are sized and shaped to obstruct the channel. Each spacer includes an orifice 60 having a diameter that is substantially smaller than the diameter of the pressure reducer's channel. In particular, spacers having a thickness of between 0.020 inches and 0.040 inches with an orifice having a 0.032 inch diameter have been incorporated in the preferred embodiment.

Therefore, for a given amount and flow rate of liquid, the liquid's pressure as it enters the first spacer's orifice is determined by the smaller cross-section of the first orifice 60. However, once this liquid passes through the orifice, it enters the larger cross-section between the first and second spacers, which allows the same amount of liquid to flow at the same rate but at a decreased pressure. In the preferred embodiment, the pressure reducer 48 includes five spacers with offset orifices. Each orifice causes a substantial pressure drop such that the pressure of the liquid from the liquid supply can be effectively reduced to well below the maximum pressure.

Figure 5:
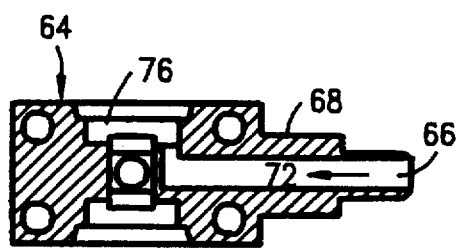
FIG. 5 is a cross-sectional view of the gas input block which forms a portion of the preferred embodiment of the manifold assembly, taken along the line 5—5 of FIG. 1.

In the preferred embodiment of the invention, the vessel 12 can be periodically charged with a gas, preferably nitrogen, to drain the vessel if the liquid is thought to be contaminated. As shown in FIGS. 1 and 5, gas is supplied through a gas source block 64 having an inlet port 66 in a connector 68. The gas source block also includes an outlet port 70, a channel 72 connecting its ports, and a mating surface 74. To control the flow of gas through the manifold assembly, the gas source block also includes a two way valve 76 located in the channel between its inlet port and its outlet port.

Returning to FIGS. 1 and 3, the alternating block 38 includes a second inlet port 78 that is directly connected to a first outlet port 80 by a second channel 81, and an outlet channel 84. In other words, gas flowing through the alternating block is not valved by the pulse valve 50. Accordingly, whenever the gas source block's two way valve 76 is open, gas flows from the gas source block's inlet port 66 to the alternating block's first outlet port 80. The alternating block also includes a second mating surface 82 (FIG. 3) that is matingly engaged with the gas source block's mating surface 74 such that the alternating block's second inlet port 78 is aligned with the gas source block's outlet port 70.

The alternating block 38 is also matingly engaged with a fourth block, a fill block 86. As shown in detail in FIG. 6, this block also includes a first inlet port 88, a first outlet port 90 to supply liquid or gas to the vessel 12, a first channel 92 connecting the ports and a first mating surface 94. The fill block's first mating surface is matingly engaged with a third mating surface (not shown) on the alternating block such that the alternating block's first outlet port 80 is aligned with the fill block's first inlet port 88.

Finally, to provide isolation between the vapor generated in the vessel 12 and the manifold assembly 10, the fill block of the preferred embodiment includes a first two way valve, a final valve 96 in its first channel 92 between its first inlet port 88 and its first outlet port 90. The final valve 96 is normally closed to prevent vapor from entering the manifold assembly and only opens to transport liquid for refilling or gas for draining the vessel.

Accordingly, in the preferred embodiment, pressurized liquid enters the manifold assembly 10 from the liquid source and loops through the liquid source block loop until the vessel 12 requires additional liquid. Then, the microprocessor opens the fill block's final valve 96 and switches the liquid source block's three way valve 32 to permit liquid to exit out the liquid source block's first outlet port 26. Next, the microprocessor pulses the alternating block's pulse valve 50 to permit a predetermined volume of liquid to flow through the pulse valve 50 and the alternating block's outlet channel 84 to the fill block's now open final valve 96 and on to the vessel. Once the vessel is refilled, the microprocessor closes the final valve 96 and the alternating block's pulse valve 50, and the microprocessor switches back the liquid source block's three way valve such that it is open to the liquid source block's second outlet port 28.

The present invention incorporates a substantially reduced "dead leg" between the liquid source block's three way valve 32 and the fill block's final valve 96. Most of the liquid entering the manifold assembly 10 is cycled through the liquid source block loop. The only liquid that remains in the manifold assembly 10 after the vessel 12 is refilled is trapped between the liquid source block's three way valve 32 and the final valve 96, in the "dead leg." Consequently, in the preferred embodiment, the length of the "dead leg" is approximately three and one-half inches. In contrast, previously water vapor delivery systems have included a "dead leg" of about six and one-half feet or more.

Figure 7:
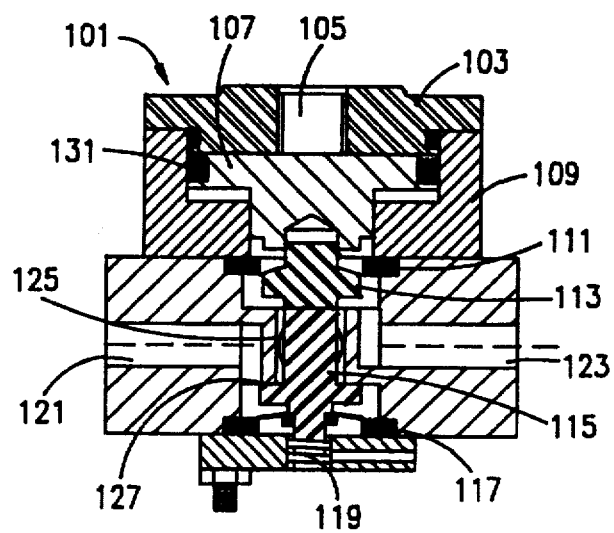
FIG. 7 is an exploded cross-sectional view of a solenoid diaphragm valve utilized in the preferred embodiment.

The solenoid diaphragm valves utilized in the preferred embodiment are selected from the SV-2 series or the PV-2 series, both manufactured by Parker Hannifin, located at Partek, 1638 S. Research Loop Road, Suite 100, Tucson, Ariz. 85710. FIG. 7 shows an expanded view of a solenoid diaphragm valve 101, including a cap 103 and a cap port 105. Pressurized air in the cap port forces a piston 107 downward in a housing 109. The piston 107 interfaces with an upper diaphragm 111, which in turn presses against an upper poppet 113, a lower poppet 115, a lower diaphragm 117 and a bias spring 119. The valve 101 also includes a first outlet port 121, a second outlet port 123 and a common inlet port 125. The upward force of the spring 119 against the lower diaphragm 117 and the lower poppet 115 presses the lower poppet against a seat 127 and biases the first outlet port 121 such that it is normally closed. However, this upward force also biases the upper poppet 113 against the upper diaphragm 111 such that the upper poppet is not in contact with its seat 129 and the second outlet port 123 is normally open.

To open the first outlet port 121, a downward force on the piston 107 must exceed the sum of the friction forces between an o-ring 131 and the wall of the housing 109, the friction force between the lower poppet 115 and its seat 127, the upward force of the bias spring 119, and the pressure differential between the inlet port 125 and the first outlet port 121. After this force is achieved, the lower poppet 115 will move away from its seat 127 and fluid will start to flow from the inlet port 125 to the first outlet port 121. Additional increases in pressure onto the piston 107 will cause the upper poppet 113 to contact its seat 129 closing the connection between the inlet port 125 and the normally open second outlet port 123. Removing the air pressure on the piston 107 will reverse the chain of event as described.

The structure of a two way valve utilized in the preferred embodiment eliminates the inlet port 125 and the upper poppet 113. The stem of the lower poppet 115 is extended such that it contacts the upper diaphragm 111. Further, the first outlet port 121 is used as an inlet port. After sufficient pressure is applied to the piston 107, fluid flows from the normally closed inlet port 121 over the lower poppet seat 127 and exits through the second outlet port 123.

The preferred embodiment of the present invention includes the final valve 96 because the solenoid diaphragm valves incorporated in the manifold assembly 10 are limited in their ability to seal adequately when a pressure differential greater than about 60 psi exists between a valve's inlet and outlet. However, in an alternative embodiment, the final valve 96 and the pulse valve 50 can be omitted if valves capable of sealing against a pressure differential of about 90 psi are utilized for the liquid source block's three way valve 32 and the gas source block's two way valve 76. In this embodiment, the channel to the vessel 12 from the three way valve 32 and the two way valve 76 is preferably sloped or vertical so that liquid and gas exiting the valves automatically drains into the vessel 12. The microprocessor of this alternative embodiment pulses the three way valve 32 to permit a predetermined volume of liquid to flow to the vessel.

This alternative embodiment can also incorporate a one way check valve (not shown) in the liquid source block's channel 30 between the manual two way valve 36 and the second outlet port 28. The check valve assists in limiting backstreaming from the drain through the second outlet port 28. This embodiment virtually eliminates the "dead leg" between the liquid source and the vessel 12. However, the channel between the vessel and the three way valve 32 is not heated and can act as a condenser for vapor entering the manifold assembly 10 from the vessel causing droplets to form in the channel. Such droplets are susceptible to stagnation and contamination unless the channel is sufficiently sloped to drain readily the droplets back into the vessel.

Figure 8:
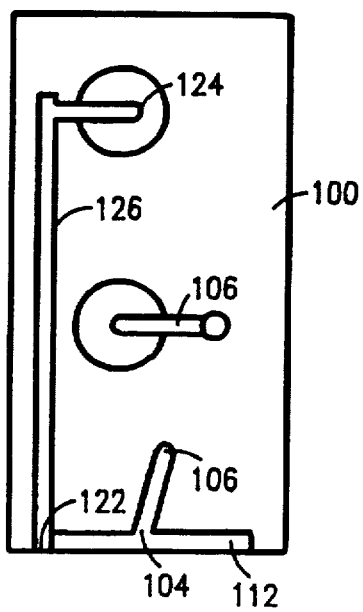
FIG. 8 is a partial cross-sectional view of the vessel communication block which forms a portion of the preferred embodiment of the manifold assembly, taken along the line 8—8 of FIG. 1.
Figure 9:
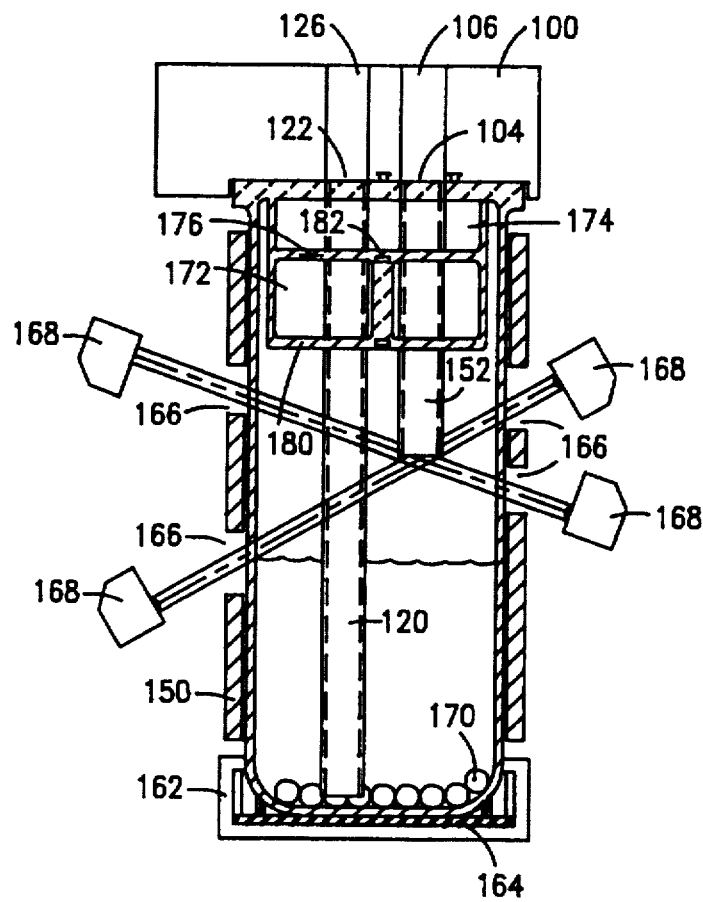
FIG. 9 a side cross-sectional view of the vessel taken along the line 9—9 of FIG. 1, illustrating the drain tube and the level sensors.

Returning to the preferred embodiment, liquid and gas are supplied to the vessel through a vessel communication block 100 (FIGS. 1, 8 and 9). This block includes a first inlet port 102, a first outlet port 104 and a supply channel 106 connecting these ports. The vessel communication block also includes a mating surface 108 that is matingly engaged with a second mating surface 110 on the fill block 86 such that the vessel communication block's first inlet port 102 is aligned with the fill block's first outlet port 90. The vessel communication block 100 also includes a socket 112 (FIG. 8) for receiving the top of the vessel 12 and a filter 114 through which the supply channel 106 passes. The filter assists in purifying liquid before it enters the vessel 12.

In the preferred embodiment, the manifold assembly 10 includes additional structures for draining the vessel 12. This function is generally performed automatically under microprocessor control when the vapor delivery system has not been used for a few days. To facilitate draining of the vessel 12, the vessel includes a drain tube 120 (FIG. 9) with an inlet and an outlet. In the preferred embodiment, the drain tube extends downwardly from the top of the vessel to a distance of about 0.070 inches above the vessel bottom. The drain tube's outlet is aligned with a second inlet port 122 in the vessel communication block 100 (FIGS. 8 and 9).

The vessel communication block further includes a second outlet port 124 and a drain channel 126 for transporting the drained liquid away from the vessel. The vessel communication block's second outlet port 124 is aligned with a second inlet port 128 in the fill block 86 (FIG. 1). The fill block also includes a second outlet port 130, a second channel 132 and a second two way valve 134 in the second channel between the second inlet port 128 and the second outlet port 130 for transporting drained liquid through the fill block.

Further, for transporting drained liquid through the alternating block 38, that block includes a third inlet port 138, a second outlet port 140 and a third channel 142 connecting the second ports. As shown in FIGS. 1 and 3, the alternating block's third channel extends perpendicular to its first channel 52 and its second channel 81. Also, as discussed above, the fill block's first mating surface 94 (FIG. 6) is matingly engaged with a third mating surface (not shown) on the alternating block. In the preferred embodiment, this engagement aligns the alternating block's first outlet port 80 with the fill block's first inlet port 88 and aligns the fill block's second outlet port 130 with the alternating block's third inlet port 138. Finally, the alternating block also includes a connector 144 at the end of the third channel to facilitate engagement with a drain (not shown).

Figure 6:
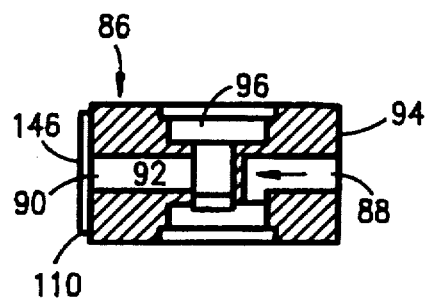
FIG. 6 is a partial cross-sectional view of the fill block which forms a portion of the preferred embodiment of the manifold assembly, taken along the line 6—6 of FIG. 1.

In the preferred embodiment, each block is a parallelpiped with perpendicular walls, such that each block has either six equal square sides and ends, or four equal rectangular sides and two square ends. To assist in aligning the outlet port of one block with the inlet port of another block, their mating surfaces can be sized such that they are substantially the same size and shape. However, as shown in FIG. 1, and specifically the engagement between the alternating block 38 and the fill block 86, the end of one block may be matingly engaged with the side of another block. In that case, the mating surfaces have a different width and shape. Additionally, one mating surface may include a knife edge 146, as shown in FIGS. 1 and 6. When two blocks are pressed together at their mating surfaces by the force of threaded rods 44 engaging with threaded nuts 46, the knife edge on one block is deformed to more securely engage the other block's grooved mating surface.

The dry vapor delivery apparatus of the present invention also incorporates a novel vessel 12 for holding liquid. The vessel is surrounded by a heater 150 for heating the liquid to generate a vapor. Three tubes extend downwardly through the vessel top into the vessel. The first tube, shown in FIGS. 1 and 9, is a fill tube 152 for supplying liquid to the vessel. The second tube is a thermo-well tube 154 (FIG. 1) for use with a temperature sensor 156 to determine the temperature of the liquid in the vessel, and the third tube is the drain tube 120 (FIG. 9) for removing liquid from the vessel, as described above. Finally, the vessel also includes a vapor outlet 158 (FIG. 1) that is connected to a strip chamber (not shown) by a passage 160 in the vessel communication block 100.

The vessel 12 is supported by a base support 162 that is generally cup-shaped. The bottom surface of the vessel may be rounded and, therefore, preferably rests on an elastomer pad 164 in the inside bottom surface of the base support. The base support is connected to the vessel communication block 100 by four springs and lag screws (not shown) such that the vessel is spring-loaded against the vessel communication block 100 to seal the top of the vessel in the vessel communication block's socket 112. To facilitate a tight seal, o-rings may be included between the drain tube 120, the fill tube 152, the vapor outlet 158, and the socket.

In general, liquid is supplied to the vessel 12 through the fill tube 152. After the liquid is heated by the heater 150 to a sufficient temperature to generate a vapor, the vapor is dried by transporting the vapor through a settling chamber that is located within the vessel and above its liquid level. The wet vapor in the vessel is pressurized by the heating process at subatmospheric pressure, and it enters the settling chamber at a relatively high speed as it passes through a narrow or small opening, a vapor inlet 178. However, the speed of the vapor decreases once the vapor enters the wider settling chamber, thereby allowing liquid drops to settle on the preferably sloped bottom of the settling chamber to form larger drops, and to exit out the vapor inlet and back into the liquid in the vessel.

The liquid fill tube 152 extends downwardly through the vessel's top, through the settling chamber, and preferably terminates at a depth of about 0.5" above the desired liquid surface. This termination point minimizes splashing during refills which can cause the liquid levels to be incorrectly measured. However, the termination point can be at any point within the vessel 12. The other end of the fill tube is connected to the fill block's first outlet port 90 through the supply channel 106 in the vessel communication block 100 (FIG. 1).

In the preferred embodiment, the fill tube 152 has a sufficiently large diameter to permit complete replenishment of evaporated liquid while a semiconductor chip is being transferred out of the strip chamber to minimize the effect of refills on the thruput of the etching system. The fill tube is also used to add gas to the vessel 12 to pressurize it above atmospheric pressure and to force liquid down in the vessel and up the drain tube 120 for a drain cycle. Another use of the fill tube is to insert boiling chips or balls into the vessel 12.

Initially, the pressurized vessel 12 is filled with cold liquid. The heater 150 then heats the liquid to the vapor system setpoint (50°–65° C.). In the preferred embodiment, the vessel is heated by a flexible foil heater having higher wattage density where the vessel is contacted by liquid and near the top of the vessel to minimize condensation in the settling chambers. Also in the preferred embodiment, the foil heater is provided with a built-in temperature sensor (not shown) embedded in the upper edge of the foil to measure the temperature of the heater and to cut off power to the heater if the heater's temperature exceeds a predetermined level.

The foil heater 150 also preferably has multiple viewing ports 166 which allow the use of optical sensors 168 (FIG. 9), located outside of the vessel 12, for sensing the level of the liquid in the vessel through the viewing ports. In the preferred embodiment, two liquid meniscus sensors, comprising two emitters and two receivers, as illustrated by the dashed lines between the sensors. The lower left receiver and the upper right emitter sense the level of the liquid when it reaches a normal level, and the upper left emitter and the lower right receiver sense the level of the liquid in the vessel when it exceeds an overflow level. In the preferred embodiment, the fill tube 152 and the drain tube 120 are not in the optical path of the level sensors.

Heating the vessel's liquid at subatmospheric pressure (approximately 100–160 Torr) tends to cause a significantly violent boiling action, so-called nucleate boiling, where relatively large diameter vapor bubbles up to 1" diameter can be generated in the vessel 12 due to the absence of surface roughness in the quartz vessel. This violent boiling action, however, also tends to diminish somewhat after degassing of the liquid is completed so that only vapor is generated. The addition of boiling chips 170, preferably polytetrafluoroethylene balls, to the bottom of the vessel tends to reduce this violent boiling action, releasing instead a continuous flow of smaller bubbles at higher flow rates. A single layer of chips is sufficient to obtain the desired effect.

In the preferred embodiment, two settling chambers 172 and 174 are located within the vessel 12, one above the other, with the first settling chamber 172 located below the second settling chamber 174 and above the desired liquid level of the vessel. The bottom wall of each settling chamber slopes downwardly toward the vapor inlet/drain 178, the narrow opening described above, preferably located at the lowest point to ensure proper drainage.

As shown in FIG. 1, a sloped dividing wall 176 separates the first settling chamber 172 from the second settling chamber 174, thereby simultaneously acting as a top wall for the first settling chamber and a bottom wall for the second settling chamber. Vapor enters the first settling chamber through the vapor inlet 178, the narrow opening or slit located in the lower end of the first settling chamber's bottom wall 180. The vapor inlet's cross-section is substantially smaller than the vessel's cross-section. More particularly, the preferred ratio of the vessel cross-section to the vapor inlet's cross-section is approximately 50 to 1. Additionally, the preferred ratio of the first settling chamber's cross-section at the vapor inlet to the vapor inlet's cross-section is approximately 16 to 1. Accordingly, the vapor speed is relatively high as it travels through the vapor inlet because the vapor inlet's cross-section is 50 times smaller than the vessel's cross-section. Then, the vapor's speed decreases when it passes into the first settling chamber, because the vapor inlet's cross-section is only 16 times smaller than the first settling chamber's cross-section.

However, the vapor inlet can be any size that causes the vapor to lose speed after it enters the first settling chamber.

The small size of the vapor inlet also serves to limit the amount of liquid entering the first settling chamber and prevents the boiling chips 170 from entering or plugging the vapor inlet during moving of the system.

As described above, as vapor travels across the first settling chamber 172, it loses some of its speed, thereby allowing liquid drops to settle on its sloped bottom wall 180, and to exit out the vapor inlet 178, which also serves as a drain. In the preferred embodiment, the partially dry vapor exits the first settling chamber through a vapor orifice 182, preferably located near the lower end of the sloped dividing wall 176 between the settling chambers. The vapor orifice 182 acts as a vapor outlet for the first settling chamber and a second vapor inlet and drain for the second settling chamber.

When the partially dry vapor enters the second settling chamber 174, additional liquid drops tend to settle on the dividing wall 176 and eventually trickle through the vapor orifice 182 to the sloped bottom wall 180 of the first settling chamber 172 and then back to the liquid in the vessel 12 through the vapor inlet 178. Of course, additional settling chambers may be added to dry the vapor further. The dry vapor exits the second settling chamber 174 through the vapor outlet 158 leading to the strip chamber through the vessel communication block's passage 160.

As shown in FIG. 1, the thermo-well tube 154 extends from the top of the vessel 12 through the first and second settling chambers 172 and 174 and into the vessel 12 such that it terminates preferably one inch below the desired liquid surface. The thermo-well tube is closed at its bottom end and a temperature sensor, in the form of the temperature sensor 156 referred to above, is positioned inside. Good heat transfer can be insured by using a heatsink compound between the temperature sensor and the thermo-well tube.

In the preferred embodiment, the vessel 12 is generally cylindrical with a two inch diameter, a dome-shaped bottom and a flat top. The diameter of the vessel is sized to generate vapor at a selected rate, as required by the strip chamber. It has been determined that a diameter of two inches is capable of generating vapor at a rate of approximately one liter of vapor per minute. The vessel is preferably made from quartz for its excellent resistance to chemical attack by liquid and to permit a visual inspection of its liquid level. Overall, the described apparatus has been demonstrated as capable of delivering vapor at a rate of up to 1000 sccm (standard cubic centimeter per minute) without flow spikes registered by a mass flow controller.

In the method of the invention, a liquid is supplied to the manifold assembly 10 and to the vessel 12 through the fill tube 152 which is connected to the manifold assembly's channel. The liquid is heated to a sufficient temperature to generate a vapor. The vapor is then transported to a settling chamber located within the vessel through a vapor inlet having a cross-section that is smaller than the vessel's cross-section. The speed of the vapor is decreased, thereby allowing liquid drops to settle out of the vapor. The liquid drops are returned to the bottom of the vessel, and the relatively dry vapor is transported out of the settling chamber.

In a more detailed method, the vapor is transported out of the settling chamber, and into a second settling chamber where additional liquid drops can settle out of the vapor. These liquid drops are also returned to the bottom of the vessel, and the dry vapor is transported out of the second settling chamber, preferably to the strip chamber.

It should be appreciated from the foregoing description that the present invention provides an improved dry vapor delivery apparatus with minimal liquid stagnation from liquid supply to vapor generator. The preferred embodiment significantly decreases the "dead leg" found in previous vapor delivery apparatuses and permits delivery of vapor at a desirable rate without apparent mass flow controller pressure spikes. The compact size of the apparatus allows it to be installed in existing equipment with minimum modifications, if any.

Although the present invention has been described in detail with reference to the presently preferred embodiment, it will be appreciated by those of ordinary skill in the art that various modifications can be made without departing from the invention. In particular, the apparatus and method of the present invention may also be used to generate vapor from other liquids. It works particularly well with base liquids, that is, liquids composed of molecules having an hydroxyl ion, OH, such as acetic acid and hydrogen peroxide. Water is another base liquid. Additionally, gases other than nitrogen may be used to charge the vessel to drain the liquid. Further, although the blocks in the preferred embodiment of the manifold assembly 10 are essentially arranged in a two dimensional formation, they may also be arranged in three dimensions without departing from the scope of the present invention. Of course, an alternative arrangement of the blocks may require changes in the channels and block interfaces from those described in the preferred embodiment. Accordingly, the invention is limited only by the following claims.

We claim:

1. An apparatus for generating dry vapor, the apparatus comprising:

a manifold assembly with a channel for conveying a liquid from a liquid source;

a vessel for holding the liquid, the vessel being secured to the manifold assembly and having a fill tube connected to the manifold assembly's channel for receiving liquid from the manifold assembly, the vessel having a cross-section;

a settling chamber located within the vessel above the liquid in the vessel for settling out liquid drops in the vapor, the settling chamber including a vapor inlet with a cross-section that is substantially smaller than the vessel's cross-section for receiving vapor, and a vapor outlet for removing dry vapor from the settling chamber;

wherein the manifold assembly comprises a first block and a second block, each block having an inlet port, an outlet port and a channel connecting the ports, the first block having a mating surface for mating with a mating surface of the second block; and wherein the first block and the second block are in mating engagement at their mating surfaces such that the first block's outlet port is aligned with the second block's inlet port; and wherein the second block's outlet port is connected to the vessel's fill tube.

2. The apparatus of claim 1, wherein each block is a parallelepiped with perpendicular walls.

3. The apparatus of claim 1, wherein the first block's mating surface is substantially the same shape and substantially the same size as the second block's mating surface.

4. The apparatus of claim 1, wherein the first block further includes:

a second outlet port connected to the first block's channel; and a three way valve in the first block's channel, the valve having an inlet for receiving liquid from the first block's inlet port, a first outlet for transmitting liquid to the first block's first outlet port, and a second outlet for transmitting liquid to the first block's second outlet port.

5. The apparatus of claim 1, wherein:

the first block's inlet port is engaged to the liquid source;

the manifold assembly further includes a third block having an inlet port adapted for engagement with a gas source, an outlet port, a channel connecting the ports, and a mating surface; and the second block includes a second inlet port connected to the channel of the second block and a second mating surface in mating engagement with the third block's mating surface such that the third block's outlet port is aligned with the second block's second inlet port, and the second block's channel provide the liquid and the gas to the second block's outlet port.

6. The apparatus of claim 5, wherein the gas comprises nitrogen.

7. The apparatus of claim 5, wherein:

the second block further includes a third mating surface; and the manifold assembly further includes a fourth block positioned between the second block and the vessel and having an inlet port, an outlet port connected to the vessel's fill tube, a channel connecting the ports, and a mating surface in mating engagement with the second block's third mating surface such that the second block's outlet port is aligned with the fourth block's inlet port.

8. The apparatus of claim 5, wherein:

the vessel further includes a drain for removing the liquid from the vessel; and the third block includes a second inlet port aligned with the vessel's drain, a second outlet port, and a second channel connecting the second ports.

9. The apparatus of claim 5, wherein the second block further includes:

a pressure reducer connected between the second block's channel and the second block's first inlet port, the pressure reducer acting to maintain a substantially steady pressure of the liquid flowing through the second block's channel by reducing the pressure of the liquid received through the second block's first inlet port.

10. The apparatus of claim 9, wherein the pressure reducer comprises:

a channel; and at least two spacers, each spacer being sized and shaped to obstruct the channel, and each spacer having an orifice with a diameter that is smaller than the diameter of the second block's first inlet port.

11. The apparatus of claim 10, wherein the pressure transducer includes two spacers and the first spacer's orifice is offset from the second spacer's orifice.

12. The apparatus of claim 1, wherein the diameter of the vessel is sized to generate vapor at a rate of about one liter of vapor per minute.

13. The apparatus of claim 1, wherein the diameter of the vessel is about two inches.

14. The apparatus of claim 1, wherein the vessel further includes a drain for removing the liquid from the vessel.

15. The apparatus of claim 1, wherein the vessel further includes a thermo-well tube for use with a temperature sensor to determine the temperature of the liquid in the vessel.

16. The apparatus of claim 1, wherein the vessel further includes boiling chips.

17. The apparatus of claim 16, wherein the boiling chips are polytetrafluoroethylene chips.

18. The apparatus of claim 1, wherein the settling chamber includes:

a sloped bottom wall;

a top wall; and the vapor inlet is an opening located at the lower end of the bottom wall, and the vapor outlet is located in the top wall above the upper end of the bottom wall.

19. The apparatus of claim 1, wherein the wall of the vessel further includes:

at least two viewing ports; and at least one sensor assembly including one emitter and one receiver, located outside of the vessel, for sensing the level of the liquid in the vessel through the at least two viewing ports.

20. The apparatus of claim 1, further comprising a second settling chamber located within the vessel above the first settling chamber for settling out liquid drops in the vapor, the second settling chamber having a second vapor inlet for receiving vapor from the first settling chamber's vapor outlet, and having a second vapor outlet for removing dry vapor from the second settling chamber.

21. The apparatus of claim 20, wherein the second settling chamber includes:

a sloped bottom wall;

a top wall; and the second vapor inlet is an opening located at the lower end of the second settling chamber's bottom wall, and the second vapor outlet is located in the top wall above the upper end of the second settling chamber's bottom wall.

22. An apparatus for generating dry vapor, comprising:

a manifold assembly including a first block and a second block, each block having an inlet port, an outlet port, a channel connecting the ports, and a mating surface for mating with the mating surface of the other block;

the first block and the second block being in mating engagement at their mating surfaces such that the first block's outlet port is aligned with the second block's inlet port;

a vessel for holding the liquid, the vessel being secured to the manifold assembly and having a fill tube that is connected to the second block's outlet port for providing liquid to the vessel, a drain for removing the liquid from the vessel, and a thermo-well tube for use with a temperature sensor to determine the temperature of the liquid in the vessel;

a heater for heating the liquid in the vessel to generate a vapor;

a first settling chamber located within the vessel above the liquid in the vessel, the first settling chamber having a sloped bottom wall, and a first vapor inlet with a cross-section that is substantially smaller than the vessel's cross-section for receiving vapor from the vessel located in the lower end of the bottom wall; and a second settling chamber for settling out liquid drops in the vapor located in the vessel above the first settling chamber, the second settling chamber having a second top wall, a vapor outlet for removing dry vapor from the second settling chamber located in the second settling chamber's top wall, a sloped dividing wall separating the first settling chamber from the second settling chamber, and a second vapor inlet for transferring vapor from the first settling chamber to the second settling chamber located in the lower end of the dividing wall.

23. The apparatus of claim 22, wherein the liquid comprises water.

* * * * *